Aug. 21, 1962    C. L. BROWN ETAL    3,050,614
APPARATUS FOR MAKING REINFORCING MESH
Filed Dec. 17, 1959    11 Sheets-Sheet 3

INVENTORS
CARL L. BROWN
JOSEPH R. MYERS
CECIL J. KINSEY
HORACE B. MENEFEE
BY
ATTORNEY

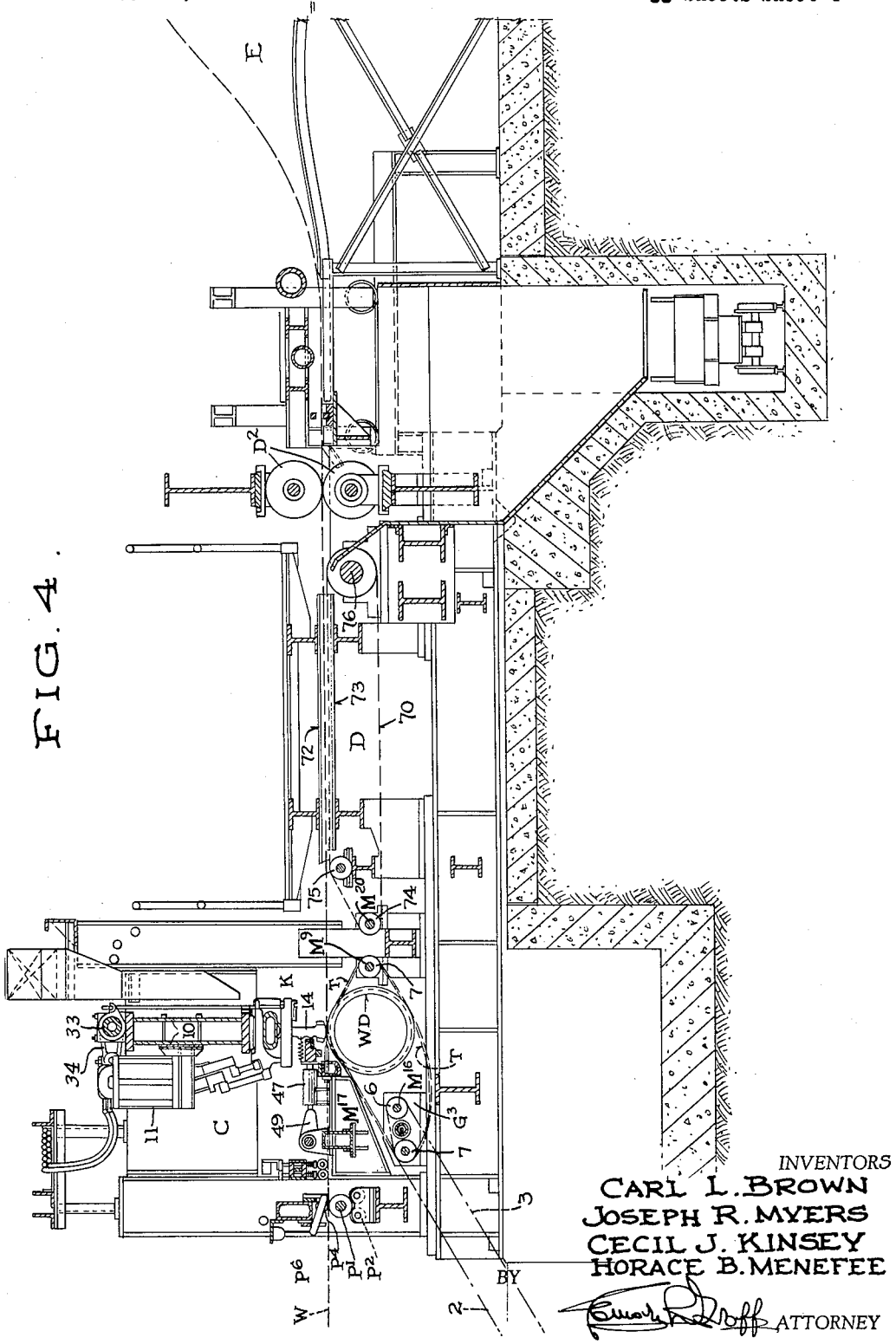

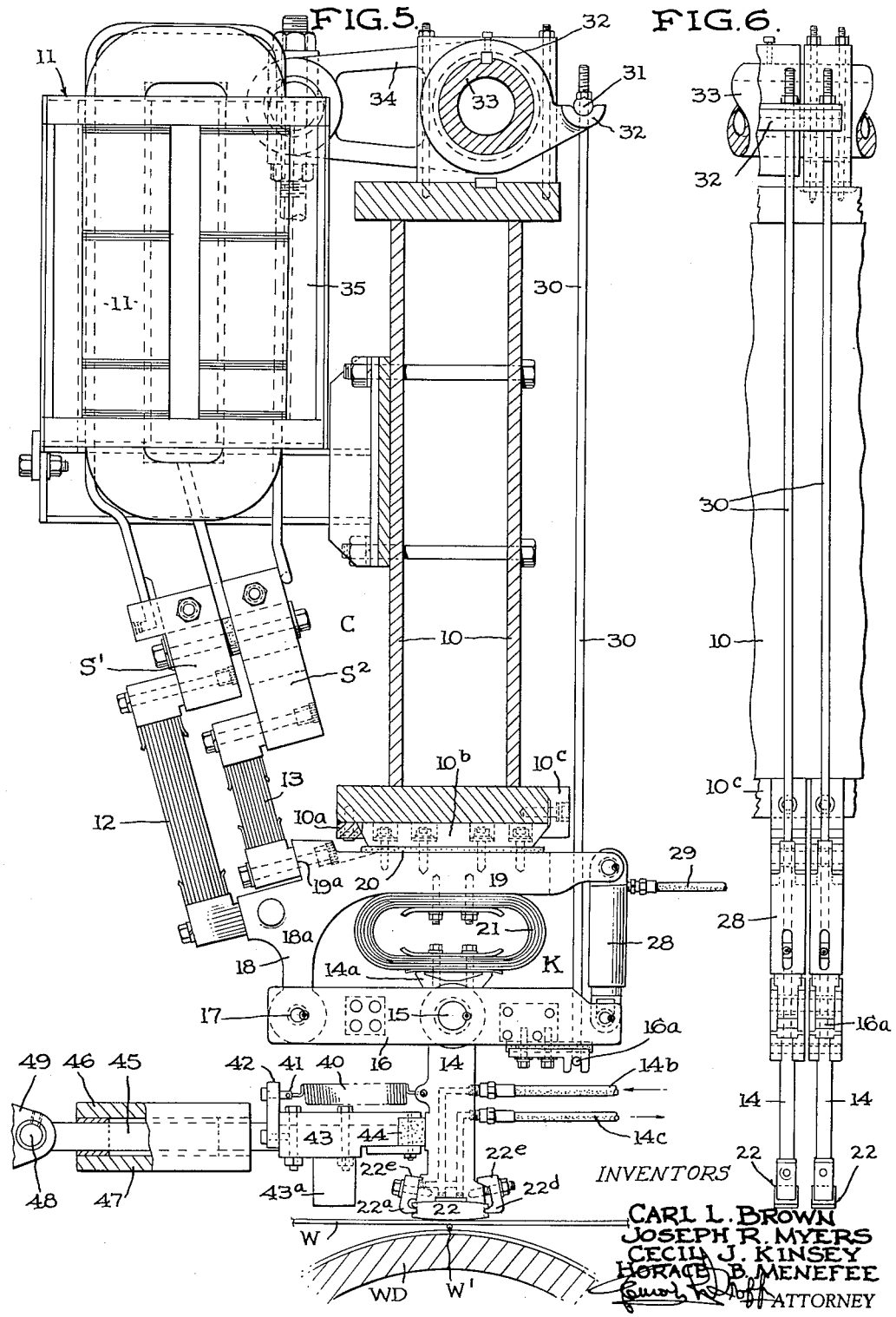

Aug. 21, 1962 C. L. BROWN ETAL 3,050,614
APPARATUS FOR MAKING REINFORCING MESH
Filed Dec. 17, 1959 11 Sheets-Sheet 6

INVENTORS
CARL L. BROWN
JOSEPH R. MYERS
CECIL J. KINSEY
BY HORACE B. MENEFEE
ATTORNEY

Aug. 21, 1962

C. L. BROWN ETAL 3,050,614

APPARATUS FOR MAKING REINFORCING MESH

Filed Dec. 17, 1959

INVENTORS
CARL L. BROWN
JOSEPH R. MYERS
CECIL J. KINSEY
HORACE B. MENEFEE

BY

ATTORNEY

Aug. 21, 1962 C. L. BROWN ETAL 3,050,614
APPARATUS FOR MAKING REINFORCING MESH
Filed Dec. 17, 1959 11 Sheets-Sheet 8

INVENTORS
CARL L. BROWN
JOSEPH R. MYERS
CECIL J. KINSEY
BY HORACE B. MENEFEE

ATTORNEY

Aug. 21, 1962

C. L. BROWN ETAL 3,050,614

APPARATUS FOR MAKING REINFORCING MESH

Filed Dec. 17, 1959

INVENTORS
CARL L. BROWN
JOSEPH R. MYERS
CECIL J. KINSEY
HORACE B. MENEFEE
BY
ATTORNEY

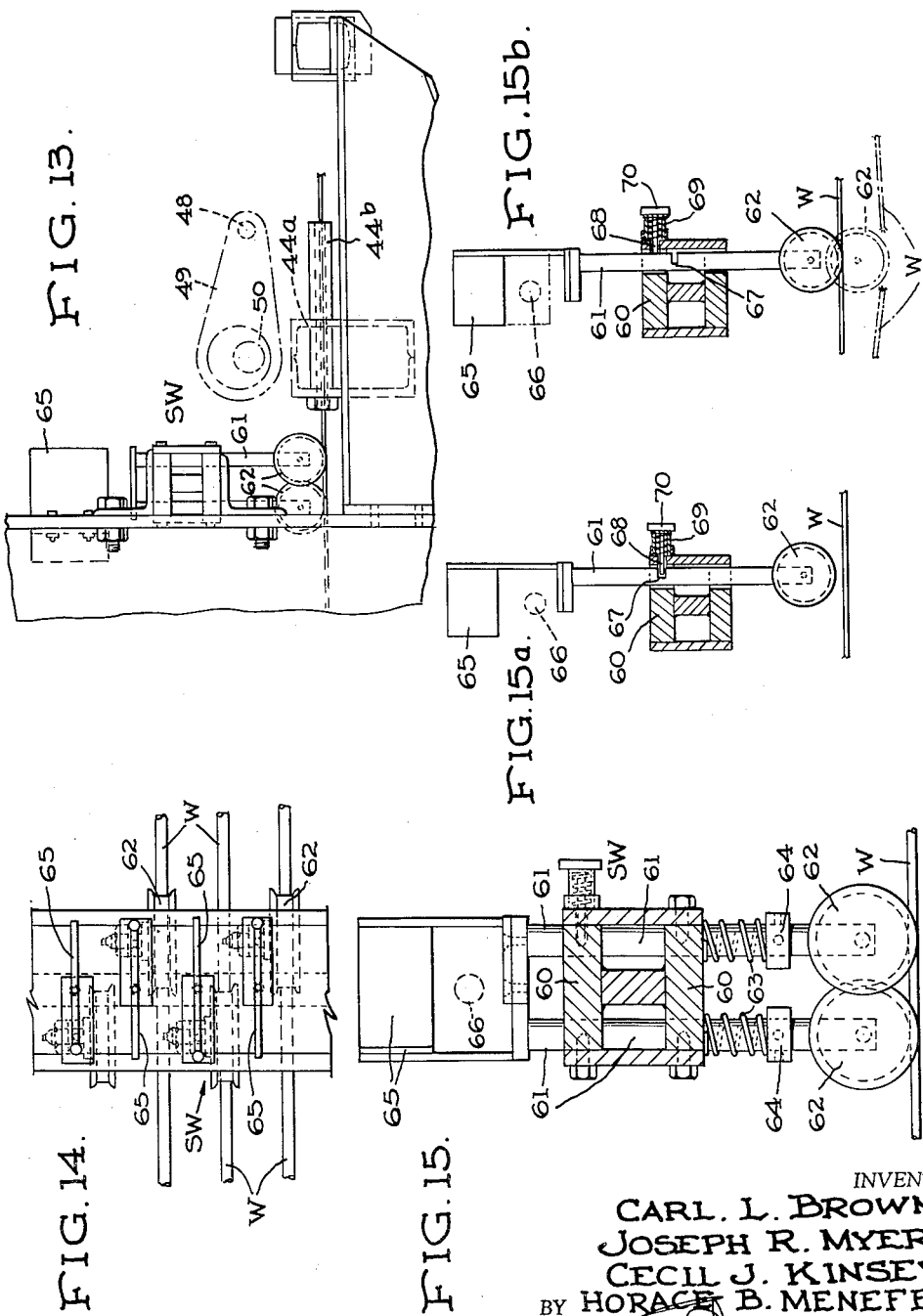

Aug. 21, 1962     C. L. BROWN ETAL     3,050,614
APPARATUS FOR MAKING REINFORCING MESH
Filed Dec. 17, 1959     11 Sheets-Sheet 11

INVENTORS
CARL L. BROWN
JOSEPH R. MYERS
CECIL J. KINSEY
BY HORACE B. MENEFEE
ATTORNEY

United States Patent Office 3,050,614
Patented Aug. 21, 1962

3,050,614
APPARATUS FOR MAKING REINFORCING MESH
Carl L. Brown and Joseph R. Myers, Youngstown, Ohio, and Cecil J. Kinsey and Horace B. Menefee, Gadsden, Ala., assignors to Republic Steel Corporation, Cleveland, Ohio, a corporation of New Jersey
Filed Dec. 17, 1959, Ser. No. 860,115
21 Claims. (Cl. 219—56)

This invention relates to an apparatus for producing wire mesh used as a grid for reinforcing concrete roads, floors, panels or similar articles where a settable cementitious body requires additional strength.

Apparatus heretofore generally in use to make mesh of the type described has been of the intermittent type, namely employing an operation wherein the continuity of movement of the mesh is interrupted at the instant of welding the longitudinal and transverse wires. While it has also been proposed in a few instances to provide apparatus for continuously and automatically assembling the longitudinal and transverse wires, nevertheless, this type of operation has normally been limited to the production of relatively narrow widths of material. A mesh product made by the intermittent method is measured by the number of cross wires per minute secured to the longitudinal wires and is relatively slow as compared with a continuous method and apparatus, wherein the product is measured in feet per minute as the unit of production speed. The difference between the two general types of apparatus is therefore primarily a matter of the amount or quantity of mesh produced in a given time which results, in the case of the continuous apparatus, in maximum production.

One of the objects of the invention is to provide a mesh machine which is the most flexible, the quickest, easiest, and most economical to operate of all known mesh machines, to change from one product specification to another while at the same time having tremendous advantages from a maintenance standpoint. This flexibility in a single machine includes, in part: broad range of wire sizes, wide range of both cross wire and longitudinal wire spacing available, mixing of longitudinal wire spacings, the quick and easy shift of welding electrodes and transformer leads, simple and accurate control of welding pressure, 0 to 90 ft./min. stepless production speed control, and accurate welding current control.

Another object of the invention is to provide an apparatus of the continuous type, wherein the longitudinal wires pass over a conductive welding drum having special features for cooperation with a plurality of individual electrode units assembled transversely of the machine and longitudinally of the drum, and capable of all being used simultaneously for the production of maximum width mesh, but which may readily and easily be pre-set relative to the drum to weld a different pattern of longitudinal and cross wires and make strips of lesser width.

More specially, an object is to provide a machine including a drum having channels for receiving transfer chains with a plurality of intervening welding lands for a multiplicity of individual electrodes, and, which has the capacity by a simple adjustment of conductors between certain transformers and said individual electrodes, to adapt the operation for pre-selected spacing of the wires in the manufacture of mesh of different widths, for example, if as previously indicated, the individual electrodes are set to produce a strip of approximately fifteen feet wide, and it is desired to make a mesh nine and one-half feet wide, the leads from the transformers to the electrodes may be arranged by simple service adjustments to use a lesser number of electrodes, while the remaining transformers and their leads remain idle or inactive.

A further object of the invention is to provide a machine that can readily be adapted to weld wire mesh to various wire spacing both longitudinally of the mesh and transversely thereof.

Another object is to provide a novel electrode assembly including a frame whose upper conductive member is insulated from its beam support and the electrode proper is pivotally supported substantially midway of a lever pivoted at one end to an arm depending from the upper conductive member. The other end of the lever is pivotally connected to an air cylinder to regulate electrode pressure exerted on the cross wires at the time of welding. The upper end of the electrode about its pivotal connection with the lever is under the cushioning influence of a flexible elliptical laminated conductor carried by the upper member of the frame.

A further object of the invention is to provide a novel welding shoe for the end of the electrode. That is to say, the lower end of the electrode is provided with means for detachably connecting the shoe therewith, and the wire engaging face of the shoe may be rotated through successive angles of 90° about its horizontal axis to present different surfaces for welding contact or as wear requires.

A still further object is to provide special bumper means for permitting the spring retracted electrodes to return to their initial or starting position with respect to the next succeeding set of cross wires at the point of welding, while, at the same time, continuously, slowly and progressively varying the position of the bumper on its backward stroke and then on its forward stroke, automatically, to shift the line of contact between the lower face of the electrode shoe and the crossed wires to further avoid rapid pitting of the shoe as would occur if the same area of the electrode was used repeatedly in effecting the welding operation.

Another object of the invention is to provide an arrangement involving the feeding and spacing of cross wires to the underside of the longitudinal wires at the welding station. This arrangement makes possible the placing of the welding drum, which requires a minimum of servicing, on the underside of the mesh so that difficulty of access is not a problem while at the same time placing in a conveniently accessible position, all of the walking electrodes; transformer and transformer welding leads; air and water electrode connections; the welding elements which need shifting when changing longitudinal wire spacing; and essentially all welding components needing adjusting or servicing on the top side of the machine.

With the above and other objects in view which will appear as the nature of the invention is better understood, the invention consists in the novel construction, combination, and arrangement of parts, hereinafter more fully described, illustrated and claimed.

A preferred and practical embodiment of the invention is shown in the accompanying drawings in which:

FIGURE 1 is a diagrammatic longitudinal view of the entire wire mesh fabric mill.

FIGURE 1ª is a detail front elevation of the tight wire detector which is the first thing the longitudinal wires pass through from the reels.

FIGURE 1ᵇ is a detail view of the tight wire detecting unit of FIGURE 1ª on an enlarged scale.

Figure 2:
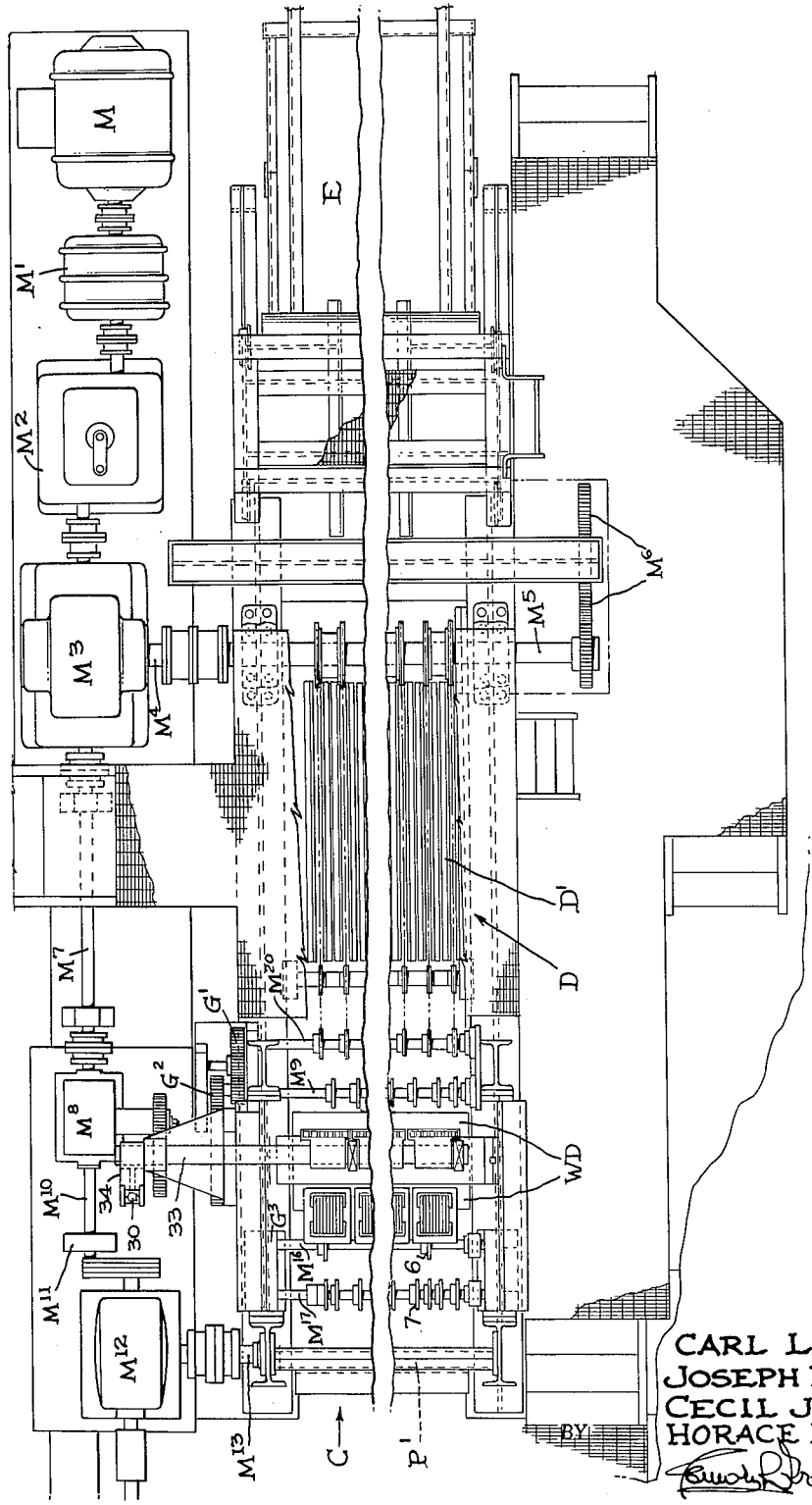
FIGURE 2 is a top plan view of the portion of the apparatus which includes the station for welding the longitudinal wires and cross wires, as well as part of the mechanism for removing the finished mesh from the machine, and the various power means and driving connections.
Figure 3:
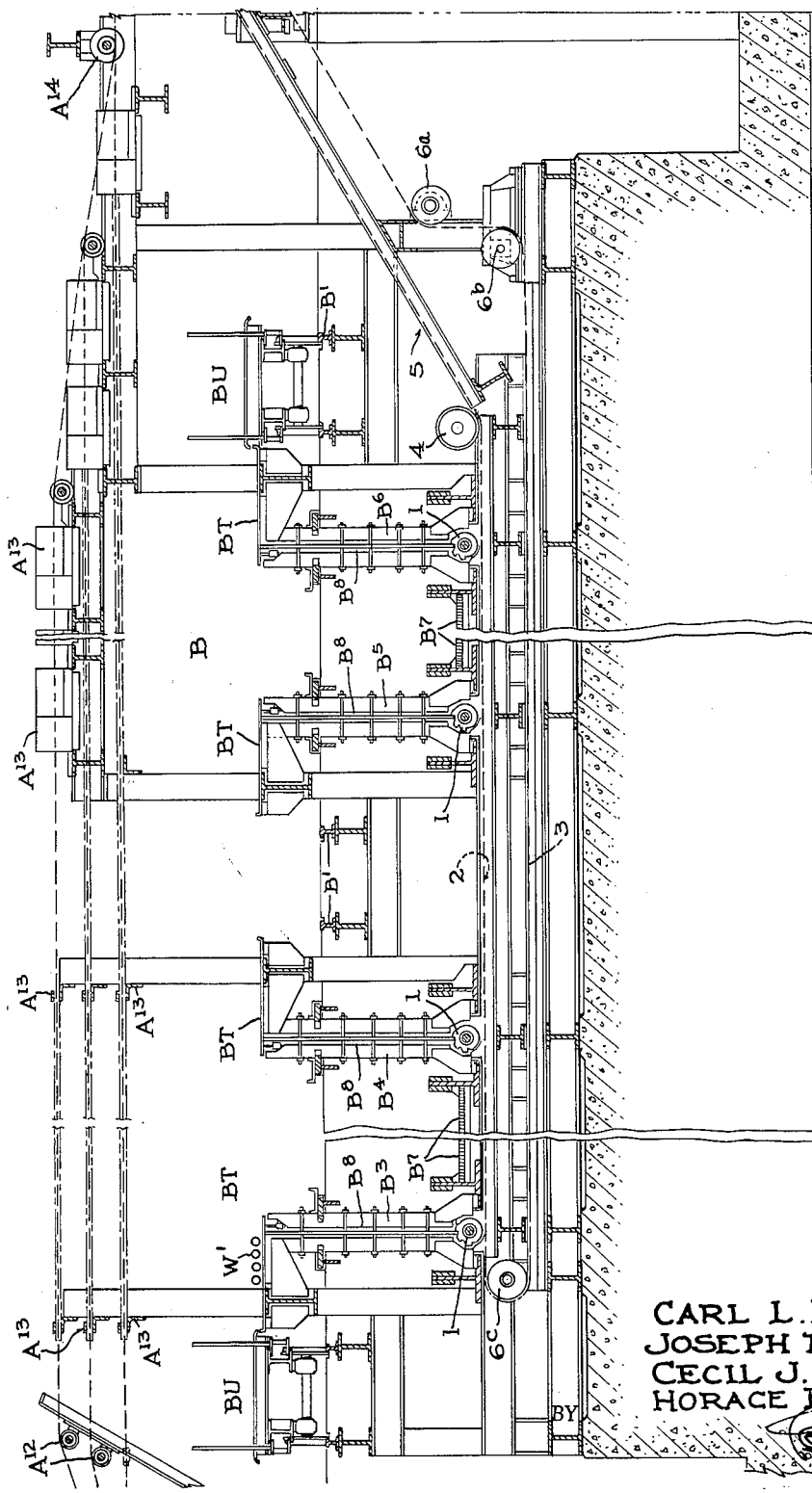
FIGURE 3 is an enlarged longitudinal vertical sectional view of the cross wire assembly station, some of the parts being shown in elevation.

FIGURE 4 is an enlarged detail vertical longitudinal section of the welding station as shown in FIG. 2 with some of the parts in elevation. FIGURES 3 and 4 are complementary. If FIG. 3 is placed to the left at a lower position in relation to FIG. 4, the continuity of the apparatus will be apparent.

Figure 5A:
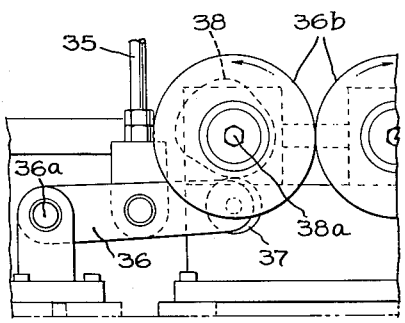

FIGURE 5 is an enlarged transverse sectional view of the head beam of the welding station showing in detail one of the individual electrode assemblies in elevation.

FIGURE 5ª is a detail diagrammatic view of the actuating means for simultaneously controlling the electrode lifting rods.

FIGURE 6 is an end elevation of a pair of the electrode assemblies shown in FIGURE 5 as viewed to the left.

Figure 7:
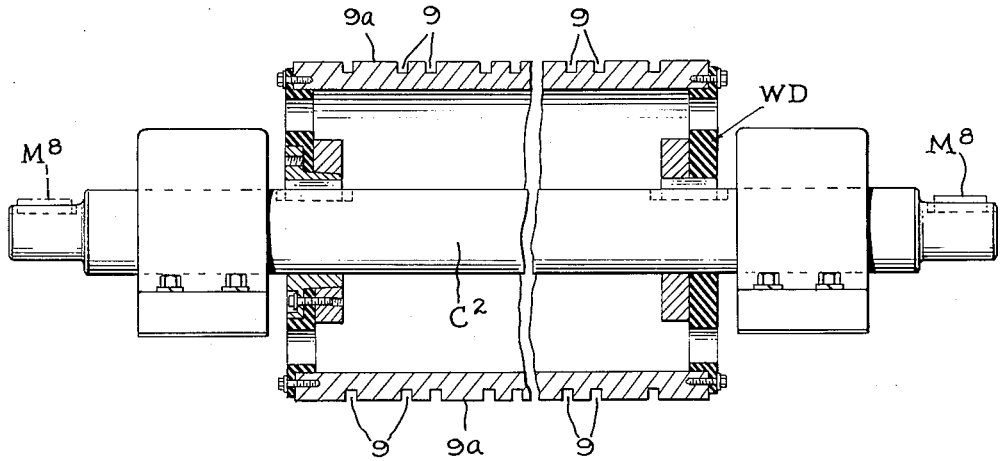

FIGURE 7 is an enlarged longitudinal sectional view of the welding drum.

Figure 8:
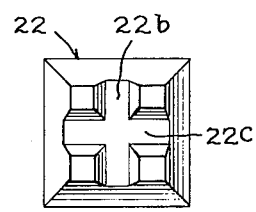

FIGURE 8 is an end view of the electrode tip.

FIGURE 8ª is a perspective view of the tip of FIGURE 8.

Figures 9, 9A:
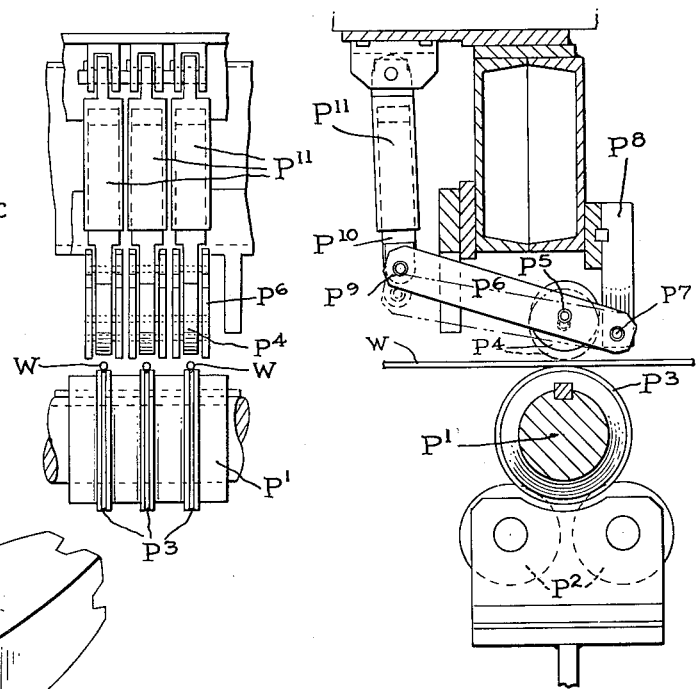
Figure 8A:
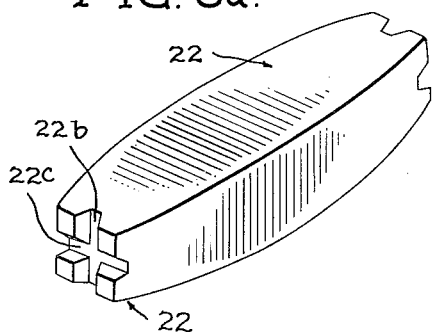

FIGURE 9 is a transverse sectional view of the pinch rolls preceding the welding station, the pressure rolls being shown in dotted lines in wire gripping relation.

FIGURE 9ª is a detail end elevation of the pinch roll arrangement shown in FIGURE 9.

Figure 10A:
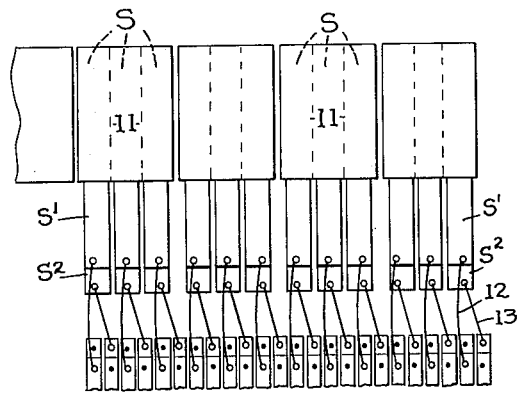
Figure 10B:
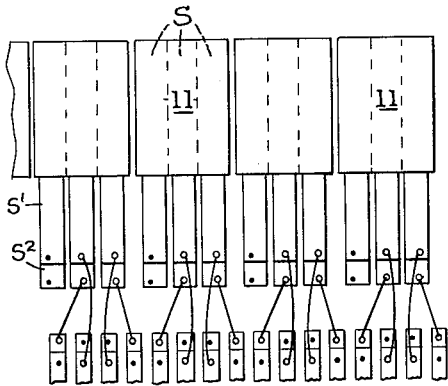
Figure 10:
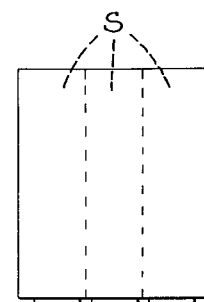
Figure 10C:
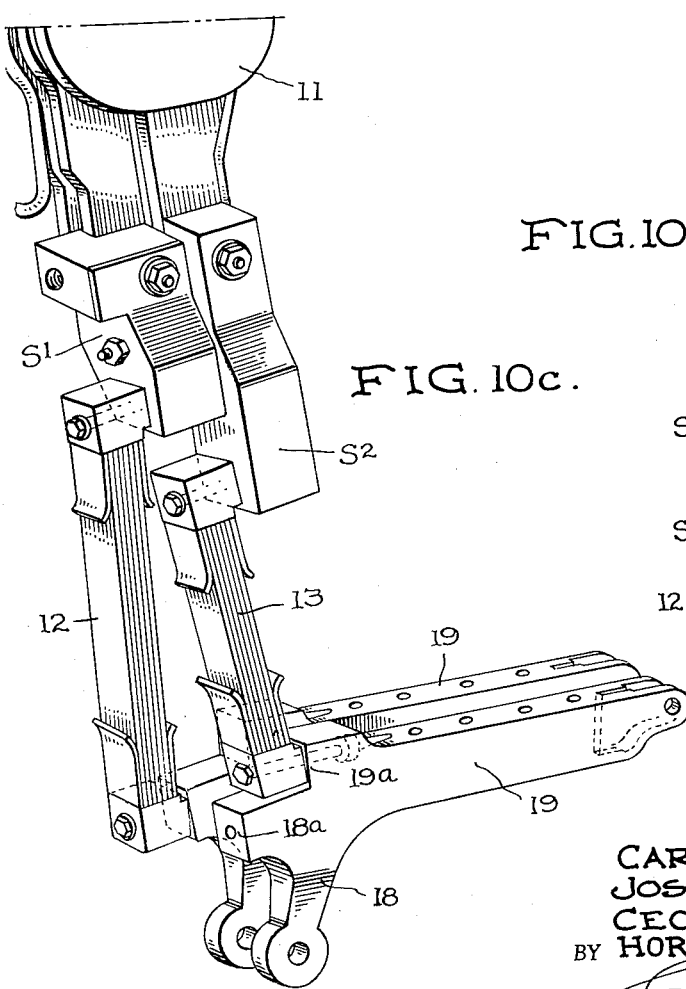

FIGURE 10 is a partial diagrammatic elevation of the front of the transformer and electrode arrangement.

FIGURES 10ª and 10ᵇ are diagrammatic views according to FIGURE 10, illustrating additional combinations and showing how the leads may be changed about relative to different electrodes to operate on differently spaced longitudinal wires.

FIGURE 10ᶜ is a detail perspective view to better illustrate the terminals of adjacent electrode frames to which the transformer leads are connected.

Figure 11:
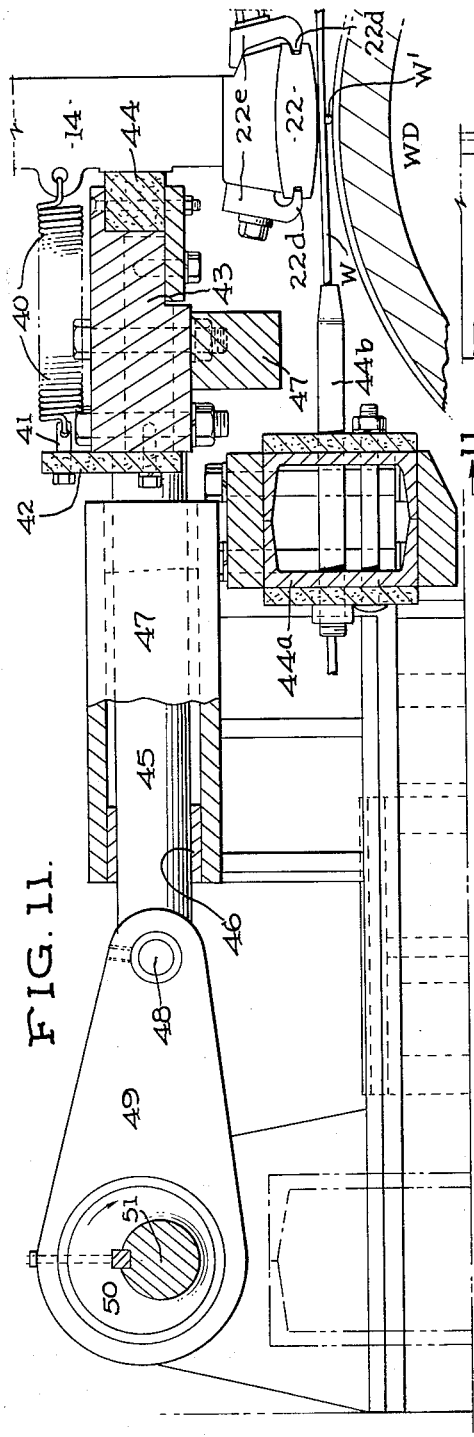

FIGURE 11 is an enlarged view partly in section and partly in elevation of the so-called bumper device for controlling the limit of the back stroke of the welding electrode.

Figure 12:
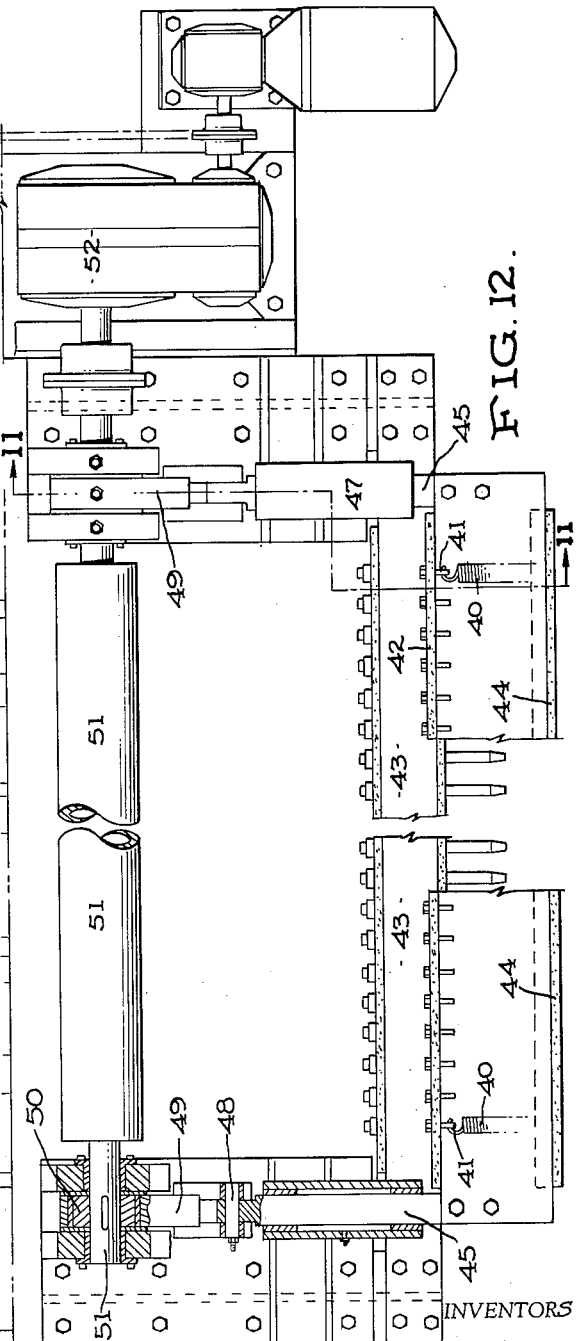

FIGURE 12 is a plan view of FIGURE 11.

FIGURE 13 is a side elevation of the signal means at the threshold of the welding station for indicating a break in a longitudinal wire, and in that event stopping the entire apparatus.

FIGURE 14 is a top plan view of FIGURE 13.

FIGURE 15 is a transverse sectional view of FIGURE 14.

FIGURE 15ª is a detail view showing the flag stem locked in wire disengaged position.

FIGURE 15ᵇ is a detail view of the flag stem and roller in wire engaging position in full lines and dropped in dotted lines as would occur when a wire breaks.

Figure 16:
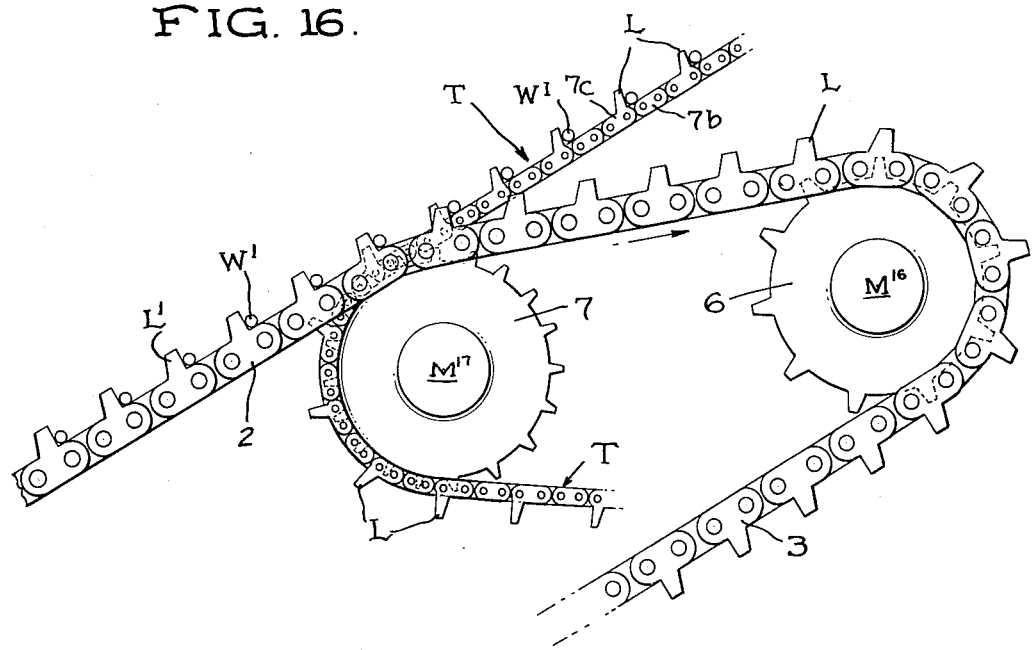

FIGURE 16 is a detail side view of a portion of the transfer chain with its lugs set for two inch, or a multiple of two, cross wire spacing.

Figure 17:
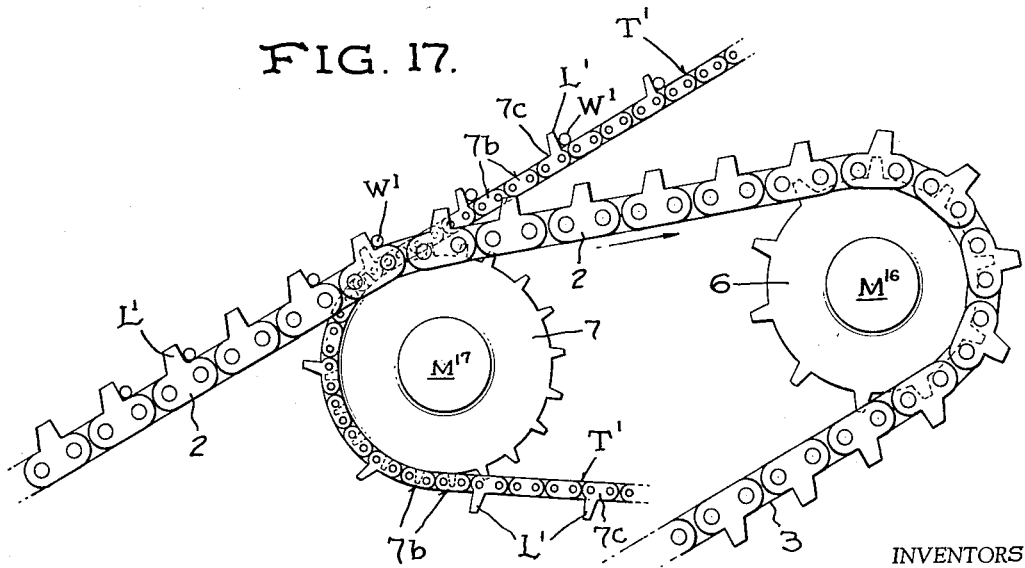

FIGURE 17 is a detail side view of a portion of a modified transfer chain wherein the lugs are arranged for placing the cross wires in three inch spacing, or multiples thereof, beneath the longitudinal wires.

Figure 18:
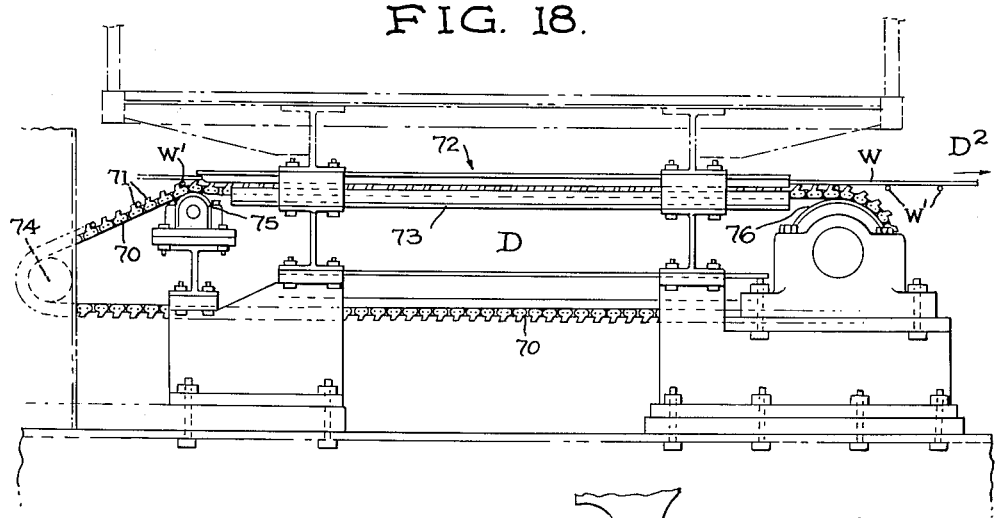

FIGURE 18 is a detail view on a somewhat enlarged scale of the tractor conveyor which pulls the completed welded fabric through the machine.

Figure 19:
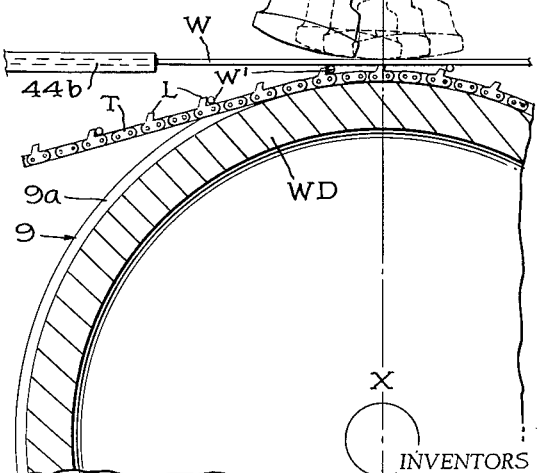

FIGURE 19 is a diagrammatic view illustrating the positions of the electrode relative to the drum and crossed wires from the beginning to the end of its forward stroke to the end of its return stroke to complete its operating cycle, and also indicating by dotted lines the maximum range of adjusting of the bumper, exaggerated for the sake of clarity.

Similar reference characters designate corresponding parts throughout the several figures of the drawings.

GENERAL DESCRIPTION

Figure 1:
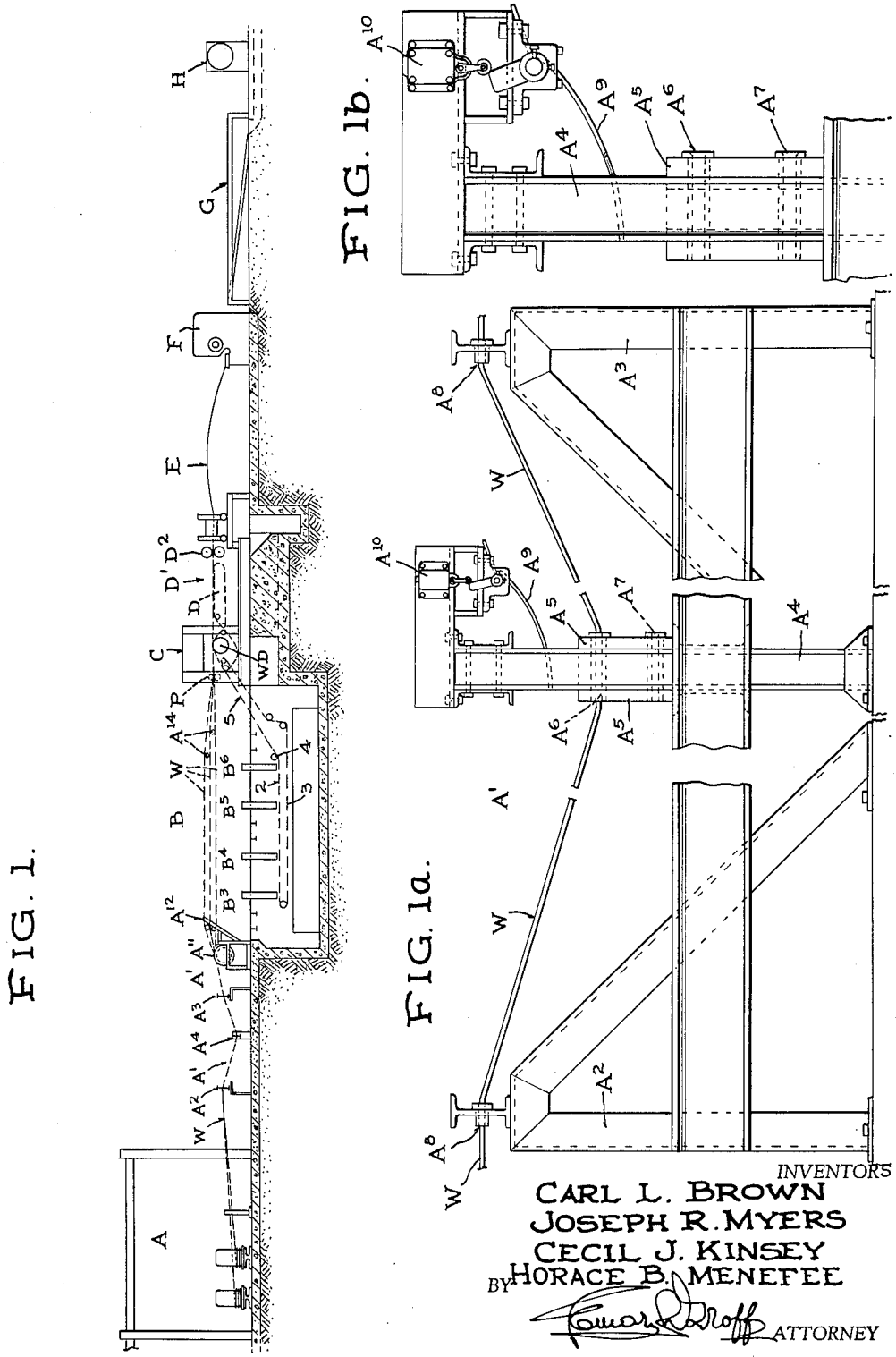

Referring first to FIGURE 1, a diagrammatic layout of the entire installation, it will be observed that the same includes a coiled wire storage and feeding area designated generally as A; a tight wire detector and tension equalizing area A'; a cross wire assembly station B, followed by a welding station C. After the longitudinal and cross wires have been welded together, the fabric is pulled by a tractor conveyors D through a delivery area D' where rotary slitters D² are used to trim the side edges of the mat to the desired width or to slit wide width mesh into multiple strips of narrower widths. Thereafter, the mat moves to a humping area E; a shear F for cutting the strip to length; and finally out to an appropriate staging area G which may include fabric mat coilers H if the gauge of wire permits.

The area A may have, for example, as many as eighty or more "high hat" type reels, seventy-nine of which have longitudinal wires W for use in the production of wire mesh thirteen feet wide with longitudinal wires W on two-inch or on other centers as will appear later. Extra reels are used for standby storage as required.

It may be conveniently pointed out here that, seventy-nine reels are necessary because there are seventy-nine individual electrodes which may be used simultaneously, or, selectively in smaller groups, to unite cross wires to the longitudinal wires, depending on the number of longitudinal wires in a mat of given width.

The welding drum WD and electrodes are so constructed and disposed that, depending upon the type of mesh to be made, the spacing of the longitudinal wires W as well as the cross wires W' may be varied according to the width of the fabricated mesh to be produced in a given operation.

Tight Wire Safety Device

Wire W from the storage reels is led through the tight wire detector area A' which includes an appropriate tight wire safety device containing the elements A² to A¹⁰ inclusive, as shown in FIGURES 1ª and 1ᵇ. As shown, this arrangement includes the outer vertical members A² and A³ and an intermediate vertical member A⁴. The latter is composed of vertically disposed I-beams whose facing channels each provide a guideway for a floating or sliding weight A⁵ provided with two holes A⁶ and A⁷. Heavy gauge longitudinal wire is threaded through the upper hole A⁶ and when lighter gauge wire is used it is threaded through the lower hole A⁷. In passing through holes A⁶ and A⁷, the wire enters through guides A⁸ on the member 2 and leaves by similar guides A⁸ on the member A³. It will thus be understood that the wire is bowed or depressed between points A⁸—A⁸ by the weight A⁵. When a snag on tangle occurs, the tight wire will cause the block A to rise in its guideways and engage the feeler strip A⁹ to trip the limit switch A¹⁰ and stop the entire line since all of the apparatus is synchronously timed. It will be understood that normally there will be as many weights A⁵ as there are longitudinal wires passing through the machine, but when operating at minimum spacing it may be necessary to thread two adjacent longitudinal wires through the same weight block hole and theoretically if either wire becomes tight, it will trip the limit switch.

The theory behind having two guides A⁶ and A⁷, one for heavy wire and one for light wire is that it requires less tension in a lighter gauge wire to actuate the device. On the other hand, it requires tension of greater magnitude in a heavy wire to support a given weight near the line connecting the points to which tension is applied, than it does to support a weight that is allowed to sag appreciably from the line of tension.

Equalizer Drum

When wire is pulled from a coil of wire on a reel, the tension, because of snags and tangling, usually varies considerably and often with the intensity of jerks. Therefore, when running wire mesh with light gauge small diameter longitudinal wires, these longitudinal wires should be wrapped a minimum of one turn around an equalizing drum A¹¹ to equalize the pull on all longitudinal wires from the welding station C back to the equalizing drum.

The equalizing drum $A^{11}$, therefore, is primarily utilized to avoid application of excess tension on a longitudinal stand at a welding station which would cause the longitudinal wire to be broken at the time of welding when the tensile strength of the wire is greatly reduced by high temperature and plastic condition of the steel. Thus, the equalizing drum $A^{11}$ insures a uniform feed of wire through the machine. For heavy strands, the equalizing drum is not usually required.

The equalizer drum $A^{11}$ is adjacent a separator rack $A^{12}$ to keep the wires in different vertical planes and properly enter their related straighteners $A^{13}$ (FIG. 3) which remove any kink that may have gotten into the longitudinal wires.

The Pinch Rolls

When the longitudinal wires approach the welding station C, they are depressed by guide rolls $A^{14}$ into a common horizontal plane to be gripped by power-driven pinch rolls P which assist the tractor conveyor in pulling longitudinal wires through area A, $A^1$, and B. The purpose of this pinch roll is to supply a large percentage of the pulling force to the longitudinal wires that is required to bring these wires to the welding station C. The object is to reduce the tension stress in the longitudinal wires during welding and avoid the possibility of parting the wire during welding.

Referring to FIGS. 9 and 9a, it will be seen that the pinch roll arrangement includes a power driven lower fixed roll P' backed up by smaller diameter idler rolls $P^2$. The periphery of the pinch roll P' is provided with a series of annular bands having grooves $P^3$ to receive the longitudinal wires W which in turn are gripped by the related roller $P^4$ pivotally supported at $P^5$ on a lever $P^6$ fixed at $P^7$ to bracket $P^8$. The opposite end of the lever is pivotally connected at $P^9$ with the piston $P^{10}$ of a pressure cylinder $P^{11}$ supported on a cross frame member of the machine (FIGS. 4, 9, 9a). By varying and regulating the air pressure in the pressure cylinder the extent of pulling force transferred to the longitudinal wires at this location may be adjusted. The tractor conveyor should maintain taut longitudinal wires throughout the machine; the help received from these rolls will reduce the tension in the wire during welding.

Although, as described later, the mesh is primarily pulled through the machine by a tractor conveyor D, the pinch rolls help feed the longitudinal wire. This avoids the possibility of parting the wire during welding at which time longitudinal strands are in a weakened plastic condition at the weld. That is to say, after the longitudinal and cross wires are welded in mat form at station C, they pass into the initial delivery area D and are pulled through the machine by a tractor conveyor D' and thence moved between slitters $D^2$ at opposite sides of area A to evenly trim the ends of the cross wires W'. The tractor then feeds the fabric to the humping station E and the transverse shear F.

The completed sections of fabric mesh, including welded longitudinal and cross wires W and W', respectively, then proceed to a run-out table G where they may be stacked or, alternatively, proceed to coilers H if the wires are flexible enough to be made into a single coiled mat.

Driving Instrumentalities

The entire apparatus is preferably electrically driven. All parts of the machine and all steps of the operation are synchronized in timed relation from the storage area A to and through the slitters $D^2$.

The upper portion of FIGURE 2 illustrates generally the driving elements employed. For example, M is a main drive motor whose shaft is connected to a dynamic eddy-current adjustable-speed electric coupling $M^1$ which, in turn, has driving connection with a two-speed change gear box $M^2$. The adjustable-speed electric coupling $M^1$ has a very large speed control range but has the characteristic of greatly reduced horsepower output and very poor efficiency in the slow speed range. When producing mesh of heavy gauge large diameter wire, the machine necessarily operates at slower speed but at the same time the power requirement might be in the high range. Therefore, by making use of gear change transmission $M^2$ it permits a slow machine speed and at the same time allows a higher coupling output speed, resulting in more available horsepower and better power efficiency at the slower machine speeds.

Gear box $M^2$ in turn is connected to a speed reducer designated generally as $M^3$. Its shaft $M^4$ is connected to the drive shaft of the tractor conveyor system of station D, and the end $M^5$ of said shaft is connected by a gear $M^6$ with the slitters $D^2$. Thus it will be understood that the shaft $M^4$ constitutes the main source of power for moving mesh or mat through the machine from the wire on the reels to the product coiling machine. The one exception to this is the driving of pinch roll $P^1$ by reducer $M^{12}$.

The driving of all conveyor chains from the head power shaft is very important in the successful operation of product transfers between the different conveyor sections. Following through the conveyor drive, the head shaft connected to $M^4$ drives the tractor chains in section D; these chains drive tail shaft $M^{20}$; through gear train $G^1$ connected to tail shaft $M^{20}$, head shaft $M^9$ is driven and in turn drives the cross wire conveyor chains T. Also, shaft $M^9$ drives gear train $G^2$ driving the welder drum WD. Conveyor chains T drives tail shaft $M^{17}$ which through a gear train $G^3$ drives head shaft $M^{16}$, thus driving cross wire conveyor chains under the cross wire magazine.

The speed reducer $M^3$ is suitably connected by shaft $M^7$ with a gear box $M^8$ which is provided with right angle output shaft paralleling a second shaft 33 upon which is mounted and keyed a cam upon which a cam following roller on rocker arm 34 rests and when cam is revolved will cause movement of rocker arm which through linkage mechanism actuates the lifting of all the electrodes 14 after each weld. The gear reducer shaft drives shaft 33 by a pair of quick-change gears. For each cross wire spacing of mesh, gears of correct ratio are installed to drive shaft 33. An electrical timer is also driven from shaft 33 which controls timing of the welding circuit. It will be noted that it is only necessary to change this one pair of change gears to adapt welder to different cross wire spacing; also note that the closer the spacing of the cross wires, the faster the electrode 14 will have to be actuated.

In addition, it will be understood that gear ratios are provided by this mechanism to control the timing of the strokes of the electrodes in accordance with the selected spacing of the cross wires. For example, the closer the spacing of the cross wires, the faster the electrodes will have to be actuated.

As will also be seen from FIGURE 2 there is a further take-off shaft $M^{10}$ which is connected by a positive drive $M^{11}$ to a speed reducer $M^{12}$. This speed reducer $M^{12}$ drives shaft $M^{13}$ which in turn drives the pinch roll shaft $P^1$ mounted on back-up rolls $P^2$. A further take-off shaft from the speed reducer $M^{12}$ is connected by a positive drive to the magazine line shaft. The magazine line shaft is geared to the magazine shafts 1 (FIG. 3) upon which the magazine metering wheels rotate.

THE CROSS-WIRE FEED MAGAZINE

The cross-wire feed magazine area designated generally as B receives cross wires $W^1$ previously cut to the desired length to correspond with the width of the mesh to be made. These wires $W^1$ are brought in no a buggy BU travelling on tracks $B^1$ (FIGS. 1 and 3), and are transferred from buggy BU to the table BT so that they will be directed into the slots 8 of the magazines $B^3$, $B^4$, B⁵, B⁶. Each magazine is composed of six movable upright leg units for supporting the cross wire stack, and two movable end guides for laterally positioning the cross wires. The slot B⁸ of each magazine is adjustable as to width to accommodate wires of different diameter so that they will be properly stacked vertically. The cross wires are fed by gravity through the magazine leg units to synchronized groups of notched metering wheels rotating on a common shaft 1 (FIG. 3). The metering wheels pick off the cross wires individually from the stack and deposit them at suitably spaced intervals upon the specially lugged chains of the cross wire conveyor 2 below the magazines. The magazines may be used individually or collectively, together with adjustments to the metering wheels, to obtain various cross wire spacings.

The chains constituting the cross wire conveyor 2 have upstanding lugs L¹ (FIGS. 16, 17), and are distributed across the magazine area to support properly and space the cross wires as they travel toward the welding station.

As will be seen from FIGURE 3, the upper reaches 2 of the conveyor pass beneath direction controlling rollers 4 to provide an upwardly inclined elevating section 5 sheaved about sprockets 6 (FIG. 4) in the welding station to lift the cross wires W¹ to a series of looped transfer chains T. (FIGS. 4, 16 and 17). The bottom reach 3 of each conveyor chain after leaving sprocket 6 passes over sprockets 6ª and under rollers 6ᵇ and 6ᶜ (FIG. 3).

The transfer chains T which pick up the cross wires from the conveyor 3 are also distributed across the welding area, and are also provided with suitable lugs L to pick up the cross wires W¹ from the upper reach 2 of the said cross wire conveyor to place the cross wires beneath the longitudinal wires W as their paths converge at the crest or zenith of the peripheral portion of the conductive welding drum WD.

WELDING STATION

The welding drum WD is mounted on a shaft C² (FIG. 7) appropriately driven by reduction gearing in gear box M⁸ in synchronism with the other instrumentalities of the machine.

As also more clearly shown in FIGURE 7, the peripheral surface of the welding drum is provided with a series of grooves 9 which receive the transfer chains T to locate them below the welding periphery of the drum in such a manner that the cross wires carried by these chains will lay flat along the intermediate lands 9ª on the surface of the cylindrical welding drum and beneath the longitudinal wires W. Moreover, it will be understood that the shaft C² upon which the drum is mounted is appropriately insulated from the machine frame, and the drum surface constitutes a high amperage conductor which in effect forms an anvil for completing the welding of the longitudinal and transverse wires at their points of crossing.

The welding station includes a head beam 10 (FIGS. 4, 5, and 6) disposed transversely of the machine and supporting at one side thereof a plurality of transformers 11 each of which is provided with three secondary windings designated generally as S. Each secondary serves through heavy conductor leads 12 and 13, two adjacent welding electrodes 14 through terminals S¹ and S².

The bottom portion of the beam is provided at the side adjacent the transformers with an abutment strip 10ª whose inner edge is undercut at an oblique angle to receive the mating edge portion of a support 10ᵇ whose opposite edge is detachably secured to the underside of the head by removable clamps 10ᶜ. The support 10ᵇ is part of an individual electrode assembly designated generally as K and which includes the electrodes and other parts as will presently appear.

By loosening clamps 10ᶜ the supports 10ᵇ may be moved laterally along the bottom of the beam to effect adjustment of the electrode assemblies, as for example, when some of the latter are not in use, and it is desired to secure them in a new given spaced relation for making a mat of less than the maximum number of longitudinal wires.

The electrode 14 is pivoted to pilot shaft 15 on a lever 16 which in turn is pivotally connected at 17 (FIGS. 4 and 10ᶜ) between the bifurcated eye portion of the vertical arm 18 rigid with horizontal arm 19 underlying the support 10ᵇ and insulated therefrom by sheet insulation 20. The arm 18 is provided with an outwardly offset conductor lead anchoring face 18ª and the arm 19 is provided with a similar inwardly inset face 19ª. This entire electrode frame assembly is designated K in FIG. 5.

The upper end portion 14ª of the electrode above pivot 15 is substantially U-shaped and bears against a laminated electrically shock absorbing spring conductor 21 which is fastened to the underside of the upper arm 19 of the frame assembly and to the upper end of electrode 14ª.

The principal function of the flexible elliptical laminated conductor is to conduct electric welding current in the most efficient manner, and also provide maximum mechanical life of laminations. The elliptical shape with two-way electrical current conductors reduces electrical energy loss by tending to oppose and nullify the magnetic fields caused by the high currents. Mechanically, the elliptical laminated conductor allows an ideal sliding action between laminations with minimum material stresses during the travel stroke required by the swinging of the electrode. Because of the high speed stroking of these flexible conductors, this controlled action between laminations reduces metal fatigue, the cause of breakage thus resulting in greatly increased useful life of the flexible conductors.

The lower portion of the electrode 14 is provided with a cooling fluid circuit 14ᵇ—14ᶜ and its extremity is fitted with a detachable welding shoe or tip 22, shown in greater detail in FIGURES 8 and 8ª.

The tip 22 is formed at each opposite end with a slot 22ª and a cross slot 22ᵇ, and each of the four sides 22ᶜ of the tip forms a welding surface which has a uniform radius to the center of the pilot shaft 15. The slots 22ª and 22ᵇ are to be selectively engaged by the flange portions 22ᵈ of detachable clamps 22ᵉ. These clamps solidly connect the tip with the shank of the electrode but by unloosening the clamps, and rotating the tip 22 through an angle of 90°, it is possible to bring a different contact surface into use.

FIGS. 10 and 10ª illustrate the maximum number of electrodes that may be served by each individual transformer 11. With this arrangement, it will be seen that a welded mesh may be produced having the closest possible spacing of longitudinal wires. This is accomplished by connecting two adjacent frames of the electrode assembly K to each secondary by means of long and short heavy conductor leads 12 and 13 respectively.

The long lead 12 extending from one terminal of the given secondary to the lower forwardly disposed anchoring face 18ª of a given electrode, and the short lead 13 extending from the other terminal of said secondary to the upper inset anchoring face 19ª of the adjacent electrode frame. The advantage of the present layout lies in the ability to dispose the electrodes on closely adjacent centers (e.g. 2 inches) across the beam 10 while providing safe and accessible electrode-secondary connections capable of conducting heavy current loads.

When it is desired to provide a mesh having a larger spacing between the longitudinal wires, it is only necessary to use a lesser number of electrode frames and to re-position them along the base of the beam 10 at the desired interval.

FIG. 10ᵇ is an example of a set up where a larger spacing is achieved by rearranging some of the electrode frames and using only two secondaries of each transformer.

In the preceding manner any number of various longitudinal wire spacings may be accommodated by the welding station by merely selectively positioning the electrode frames. Only so many of the secondaries S are used as are required to serve the selected number of electrodes. As shown in FIG. 10b, only two of the available three secondaries of each transformer are being used. If still a greater spacing is desired, certain of the transformers may not be used at all. The only requirement concerning selection of secondaries is that when one terminal S' is used, then its underlying terminal S² must also be used and must be connected through a lead 12 or 13 to an adjacent electrode frame. This is necessary to insure a complete welding circuit for each electrode 14.

The normal welding circuit as explained, produces two mesh welds in series from one transformer secondary. In case the total number of longitudinal wires is an odd number, the remaining single mesh weld is obtained by one electrode assembly connected in the usual manner to a secondary of a transformer but the other companion terminal of the secondary is connected by a flexible lead to a unit making a wiping contact to the welding drum, thereby completing the electric welding circuit.

The advantages afforded by the foregoing electrode and transformer construction are important. For example, the arrangement permits a close spacing of the individual electrodes, and, also, the utilization of heavy current conducting leads in a practical, safe, and readily accessible manner, because of the vertical and horizontal offset relation of the faces 18ª and 19ª to which the long lead 12 and short lead 13 may be respectively attached.

The complete electrical circuit for a given secondary can be traced as follows: secondary terminal S'; its associated laminated conductor lead 12, arm 18 via face 18ª, the flexible laminated spring conductor 21, U-shaped formation 14ª of electrode 14 and electrode tip 22, across the juncture of intersecting wires to welding drum WD along the surface of the drum to the wire juncture beneath the next adjacent electrode up through said latter electrode, its flexible conductor; arm 19; across face 19ª, through laminated lead 13, to the other terminal S² of the other secondary S.

There may be negligible current flow through a shunt path including the pivot connections and depending arms 18, and likewise a very limited amount of current flows through the cross wire from one juncture to the other. However, the heavy welding current flows through the path described, and as might be expected, this welding current is of approximately high amperage.

It may be also pointed out in connection with FIGURE 5 that the lower lever 16 and the upper fixed arm 19 are connected at their bifurcated free ends by a piston and cylinder arrangement 28 which is supplied with controlling fluid through pipe line 29. When the electrode tip 22 is forming the weld between the transverse and longitudinal wires, fluid pressure behind the piston in the cylinder will impose an appropriate force on the crossing points to form the welds. Thus it will be seen that the maximum force or load on the electrode 14 can be controlled by regulating the air pressure in the cylinder piston device 28.

As a practical example, in welding heavier wire, it is found that a load of approximately seven hundred pounds exerted by the electrode will produce a proper weld.

Assupming that the electrode is pivoted approximately at the center of the head beam 10, the force exerted on the piston of fluid device 28 by such load will be approximately three hundred fifty pounds. Further assuming that the diameter of the piston is one and one-half inches, it follows that the area thereof is about 1.77 square inches. This means that if the air pressure within the cylinder is maintained at approximately two hundred pounds per square inch (350÷1.77), the seven hundred pound load on the electrode will be maintained. For a greater load, the air pressure within the cylinder would be increased and for a lesser load the air pressure therein would be decreased.

When the electrode is lifted from its vertical position, the ellipitcal laminated conductor 21 is elastically compressed in spring-like fashion but maintains the same low resistance current conducting path to the electrode at any position thereof. The force required to deform the laminated conductor is insignificant as compared to the total load on the electrode.

Electrode Lifting Means

The lever 16 of each electrode supporting frame K has its free end connected at 16ª with a lifting rod 30 (FIGS. 5 and 6) whose upper end is provided with a cross member 31 which rides in the trough of a lifting cam 32. This cam is keyed to shaft 33 which is common to all of the electrodes and extends transversely of the machine. The said shaft is connected to rocker arm 34 coupled to a vertically movable rod 35 operated by a lever 36 (FIG. 5ª) pivoted at 36ª and having at its free end a roller 37 which rides on cam 38 whose shaft 38ª is driven by gearing 38b. Thus, all of the electrodes may be lifted off the wires simultaneously at a time interval following the completion of the welding operation in opposition to the loading exerted by the shock absorbing spring 21 and air cylinder device 28, and thereafter permitting them to descend into position for the next welding cycle of the electrodes 14.

Automatically Adjustable Bumper Means for Electrodes

Although the welding electrode 14 is shown in its vertical firing position in FIG. 5, nevertheless its initial position prior to engagement by the wire may be slightly to the left of the firing position shown, depending upon the position or location of the so-called bumper and wear distribution apparatus now to be described by reference to FIGS. 5, 11, 12 and 19.

The side of the electrode opposite the cooling connections, is connected with retractile spring 40 anchored at 41 to an insulated spring holder 42 mounted on support 43 having an insulated stop or bumper 44. This bumper is in effect a variably positioned device for establishing the limit of the back stroke of electrode 14 as it returns to initial or starting position for all of the welding electrodes. To that end, the support 43 extends substantially across the width of the machine (FIG. 12), and is slidably mounted on appropriate guiding means 43ª (FIG. 11). That is to say, 43 and 44 (FIG. 12) are connected with push rods 45 each slidably guided in a bushing 46 of the fixed guide or sleeve 47. The exposed end of 45 is pivotally connected at 48 with the arm 49. This arm rides on cam 50 keyed to shaft 51 driven slowly by reduction gearing 52 actuated by M⁸.

The shaft 51 makes approximately one revolution each sixty minutes. Therefore, it will be seen that as the cam 50 turns slowly in a complete cycle, it will gradually move the arm, the push rod and the bumper assembly backwardly and forwardly so that the amplitude of swinging movement of the electrode 14 will infinitesimally be moved each time a weld is made.

Referring to FIG. 19, it will be understood that the description of the movement of one electrode 14 applies to all. The full line position of the electrode represents the backward limit of the bumper 44 with the leading edge or toe of the tip 22 in frictional engagement with the wire W due to retractile spring 40 and the force of laminated loop spring 21. As the wire W moves and drum WD turns clockwise, the electrode moves counterclockwise to preliminary wire clamping position 14ª, thence to firing position 14b, as shown by dotted lines, leaving the bumper 44 in both positions against the force of spring 40. From firing position 14b, the electrode moves to position 14c which is the limit of its forward stroke at which time it is raised from the finished mesh by lift rod 30 to return against the bumper by the force of retractile spring 40. Meanwhile, the bumper moves slightly forward from its full line position so that when the electrode engages therewith, a new spot on surface 22ᶜ will be presented for the next firing position.

Adjacent and below 43 there is provided a wire guide support 44ª having wire guides 44ᵇ.

To avoid firing taking place on the same spot on the drum, the gear drive mechanism which rotates the welding drum WD is provided with a "hunting tooth" which results in a continual shift in the angular position of the welding drum so that it is thrown out of phase by a small increment and thereby provides a new and different surface or point of contact for the weld on the drum surface that would normally occur after a given weld spot has passed through an angle of 360°.

Thus, the wear over the surface of the drum in a given peripheral path is always continually and evenly distributed. It may be also pointed out that the actual welding interval may last only four or five cycles of a sixty-cycle power supply, which is an automatic variance depending on the wire size being welded.

TRANSFER CHAINS

The transfer chains T—T' are shown in detail in FIGURES 16 and 17. As previously indicated, these chains are in the form of loops which are driven by the sprocket wheels on power driven shaft M⁹.

Referring first to FIGURE 16, it will be seen that the transfer chain illustrated in this instance comprises single links 7ᵇ which are intended for cooperation with the sprockets and a single lug link 7ᶜ having an upstanding lug L. With this arrangement of links and lugs, it may be pointed out that these transfer chains will have their lugs so spaced as to permit a two-inch cross wire spacing or any multiple thereof.

The chain T' of FIGURE 17 illustrates the use of two plain links 7ᵇ in the assembly shown. Thus, there are three links including the lug link, resulting in a greater distance between the lugs L' as shown in FIGURE 17. In this arrangement, the chain will space the cross wires a distance of three inches apart or any multiple thereof.

The transfer chains T—T' are smaller and lighter than the conveyor chains 3. The small chain is employed in order to secure the necessary clearance at the welding station when making mesh with longitudinal wires on two inch centers. To insure locating the cross wires accurately at the welding station, several of the light transfer chains T are employed and when considering that friction and conveying cross wires are the only load on chains the average tension load per chain is relatively small. The light transfer chains are of short length, therefore, the summation of wear at chain joints will remain small and not seriously affect the alignment of the cross wire carrying lugs on transfer chain T.

By using heavier conveyor chains we have found that the extra strength and the resultant increased resistance to wear aid in controlling the chains in their guides, and together with the lesser number of chain joints, reduces the summation of wear error and helps maintain better lug alignment on the chains.

The conveyor chain system is divided into three sections in which the chain lug alignment is corrected at each driving head shaft. The transfers between sections operate without snagging the product. The conveyor chain system is driven from a single head shaft but each section is also driven by its own head shaft which is towed by the chain in the previous conveyor section.

The angle of the upper flight of the transfer chains relative to the angle of the chains 3 at the point of transferring the cross wires W is important.

SIGNAL WIRE INDICATOR

In addition to the tight wire safety device in the area A' (FIGS. 1 and 1ª) which as previously explained cuts off the entire machine if a wire fails in the area A, it is also proposed to provide an additional signal indicator for each longitudinal wire as it approaches the welding station.

As shown in FIGURES 13, 14 and 15, this arrangement includes a transverse row of side by side indicator devices. These devices are located upstream of the welding station so as to avoid tangling substantially at the junction of the longitudinal wires with the cross wires.

As illustrated in the top plan view FIGURE 14, the transversely aligned signals SW are mounted on a fabricated I-beam structure 60. Since the indicators (seventy-nine in number) are of the same structural characteristics, a description of one will suffice for the other.

The beam 60 supports a plurality of vertically slidable shafts 61 disposed in staggered relation, FIGURES 14 and 15, said shafts having at their lower ends wire engaging rollers 62 to ride on top of the related longitudinal wire W.

Each shaft 61 is free to move vertically in appropriate guides on the beam 60 and is surrounded by a spring 63 confined between the bottom of the beam 60 and a collar 64 on the shaft for the purpose of positively urging the roller onto the wire.

The upper end of the shaft is provided with a flag 65 to indicate the continuity or breaking of the longitudinal wire which it serves.

Due to the staggered relation of the shafts 61, and the fact that the flags 65 are reversed, it will be seen that the mating reversed flags will act as a shutter with respect to the photo-electric cell 66 so that when wire failure occurs and the flags drop, the cell beam will be interrupted and operate a master switch to cut off the entire machine.

As illustrated in FIGURES 15ª and 15ᵇ, each of the shafts 61 are provided with a radial socket 67 for receiving a pin 68, urged toward the shaft by a spring 69.

When the inner end of the pin fits in the socket, each shaft may be held elevated as when the machine is not in use or a particular wire run is not in use. But when the head 70 of the pin is pulled against the tension of the spring to remove the inner end of the pin 68 from the socket 67, the shaft is free to move down vertically as shown in FIGURE 15ᵇ. The roller on the shaft will then bear against its wire W so that if the wire breaks, the shaft and its flag will drop to interrupt the beam.

THE TRACTOR CONVEYOR

The tractor conveyor D which applies the principal tensile load on the completed fabric, is shown in more detail by FIGURE 18. This conveyor includes a plurality of continuous chains 70 (FIG. 2), only one of which appears in side elevation in FIGURE 18, because they are all alike and are simultaneously driven to pull the completed fabric through the welding station, and, also in effect to push it into the humping area prior to the sides being trimmed by the shears D².

The links of the chains 70 have upstanding lugs 71 which engage the cross wires W' as the upper reach of the continuous loop traverses a plane tangent to the upper periphery of drum WD. Also, the upper reach of the chains pass through suitable vertically spaced hold-down guides 72—73 to insure that the fabric is properly gripped by the lugs.

The chains pass over sprocket 74, roll 75 and sprocket 76 one of which, namely 76, is power driven by M³, M⁴, M⁵ (FIG. 2) to steadily but firmly pull the fabric from the welding station in a manner that will not manifest enough tension to break the newly formed welds at the point of crossing of wires W and W'. Of course, the pinch rolls and the welding drum downstream of the pinch rolls also contribute to proper feed of the wires as well as the mat.

We claim:

1. In an apparatus for continuously electrically making welded reinforcing mesh, the combination, comprising, a longitudinal wire storage station, a cross-wire assembly station beneath the level of said longitudinal wire storage station, means for moving longitudinal laterally spaced wires from the storage station and over the cross wire station, a welding station downstream of the cross wire assembly station, conveyor chains for elevating the cross wires toward the longitudinal wires at the welding station, a single lower rotatable welding drum, a plurality of juxtaposed individual rocking electrodes for cooperation with the drum, transfer chains partially overlapping in travel said conveyor chains for picking up the cross wires from the conveyor chains and placing them in selective spacing beneath the longitudinal wires at said drum for welding between the drum and the electrodes, and electrically driven power means for controlling the operation of the apparatus.

2. In an apparatus according to claim 1, wherein, a tight wire indicator is interposed between the wire storage station and the cross wire station to stop said power means upon the increase in tension of a longitudinal wire prior to reaching its breaking point.

3. In an apparatus according to claim 1, wherein, a longitudinal tight wire indicator is interposed between the wire storage station and the cross wire assembly station, and includes, wire guides spaced apart in the path of the longitudinal wires, and intermediate means between said guides responsive to wire tightening to stop said power means, said intermediate means including a vertical guideway, a block having wire guides through which the wires are threaded, a limit switch in circuit with said power means, and a feeler element for said switch adapted to be engaged by said block upon the ascent of the block when the wire becomes tight as the result of a snag or snarl in the wire to actuate said switch and stop the power means.

4. In an apparatus according to claim 1, wherein, a single electric-eye beam is included in circuit with said power means, and a transverse row of longitudinal wire break indicator units is disposed at the threshold of the welding station, said units each including a shaft having a wire engaging roller at its lower end and having a flag at its upper end normally disposed above the reach of said beam, means for selectively locking any of said flags in an elevated inoperative position above the reach of said beam, the flags of each shaft being disposed in reverse relation crosswise of the row, whereby when a wire breaks the flag will drop and interrupt the beam to stop the apparatus.

5. In an apparatus according to claim 1, wherein the transfer chains are provided with links having lugs disposed at spaced intervals different from corresponding intervals of lugs on said overlapping conveyor chain to permit of varying the spacing of the cross wires relative to the longitudinal wires.

6. In an apparatus according to claim 1, wherein a tight wire indicator is located between the wire storage station and the cross wire station, and a wire break indicator means is disposed at the threshold of the welding station, both of said indicators being included in the power means circuit to interrupt said circuit upon the existence of a tight wire, or upon the occurrence of a wire break, respectively.

7. In an apparatus according to claim 1, wherein, the welding station includes a head beam for slidably and adjustably supporting a plurality of juxtaposed individual electrodes, and the single lower welding drum has intervening welding lands between transfer chain grooves on the periphery thereof.

8. In an apparatus for electrically welding longitudinal and transverse wires to provide reinforcing mesh, a conductive rotatable drum, and a series of electrode assemblies above the drum, each assembly including a frame comprising a horizontal arm and a substantially vertical arm, a lever pivoted at one end to said vertical arm, an electrode medially pivoted to said lever, a shock absorbing spring confined between the upper end of the lever and the said horizontal arm, a piston and cylinder connecting the free end of the lever and the horizontal arm, and means for controlling pressure to the piston and cylinder to regulate the force applied by the lower end of the electrode to the crossing point of the longitudinal and transverse wires.

9. In an apparatus for continuously electrically making welded reinforcing mesh from spaced longitudinal and transverse wires that intersect to form junctions, the combination, including, a single lower conductive drum having a continuous arcuate peripheral surface, a plurality of juxtaposed spring retracted individual rocker electrodes having welding tips and suspended side by side on pivot axes above the drum for initial forward movement as the longitudinal and crossed transverse wires pass between the tips of the electrodes and the periphery of the drum to weld the junctions of both wires, bumper means for limiting the backward stroke of the electrodes, means for automatically withdrawing and advancing the bumper means relative to the location of the said pivot axes of the electrodes to shift the position on the surface of the welding tips as they contact the crossing wires above the arcuate surface of the drum, and means synchronized with the operation of the electrodes for simultaneously and vertically lifting them momentarily after the weld is made.

10. In an apparatus according to claim 9, wherein, the tips are recessed at opposite edges, and clamps on the electrode releasably engage the recesses as the tips are rotated on their longitudinal axis.

11. In an apparatus according to claim 9, wherein, the individual electrodes are each carried by a conductive frame insulated from a beam supported transversely above the apparatus, said frame having a pair of vertically spaced and horizontally offset upper and lower fastening receiving sockets, transformers including secondaries supported on said beam, conductive leads detachably connected at their upper ends with separate secondaries of the transformers and having fastenings at the lower ends thereof for connection alternately with the upper and lower sockets of adjacent electrode frames selected in accordance with the number and spacing of longitudinal wires of the mesh.

12. An apparatus according to claim 9, wherein, the apparatus includes a transverse beam, transformers supported by said beam, a series of juxtaposed separate individual frames conductively connected to said transformers and each having an integral horizontal arm and a substantially vertical arm and adjustably and insulatingly connected to said beam, a lever pivotally connected at one end with the said vertical arm and having the electrode medially pivoted thereon, a flexible current conducting member between the underside of the horizontal arm and the upper end of the electrode, and a fluid cylinder connecting the horizontal arm and the lever to exert and release pressure on the electrode.

13. An apparatus according to claim 12, wherein, a rocker arm is supported on the upper portion of the beam, and a vertical rod has its lower end connected to the lever arm of the electrode assembly and its upper end loosely supported by a fork on the rocker arm, said rocker arm and rod adapted to raise the electrode against the action of the fluid cylinder.

14. In an apparatus for continuously electrically making welded reinforcing mesh, the combination, comprising, a welding drum disposed transversely of the path of travel of the mesh, a plurality of individual electrodes suspended above the longitudinal axis of the drum for welding cooperation therewith, a support disposed parallel to the axis of the drum, an insulated bumper carried by said support, springs connected to the support and to the electrodes for retracting the electrodes simultaneously toward the bumper, push rods connected to said support insulatingly mounted in sleeves and connected at their rear end to a cam through a link arm, a shaft for said cam, and means for driving said cam in synchronism with the cycle of the electrodes to cause the bumper to change position after each weld and permit the electrodes to relocate after each weld to provide a new welding contact surface between the electrode and the corresponding wires.

15. In an apparatus for continuously electrically making reinforced mesh, the combination, including, a cross wire assembly station, a welding station comprising a single rotary drum and a plurality of individual electrodes supported longitudinally above the drum, a series of pinch rolls located substantially between the cross wire assembly station and the welding station, said pinch rolls serving to advance the longitudinal wires past the cross wire assembly station and to the welding station where the cross wires are brought in contact with the longitudinal wires, and a tractor conveyor disposed beyond the welding station to pull the reinforced mesh from said welding station.

16. In an apparatus for continuously electrically making reinforced mesh from separate longitudinal and transverse wires, the combination, including, a cross wire assembly station, a welding station comprising a rotary drum and a plurality of individual electrodes supported longitudinally above the drum, and a series of pinch rolls located substantially between the cross wire assembly station and the welding station, said pinch rolls serving to feed the longitudinal wires through the apparatus, said pinch rolls comprising a primary roll having grooved traction elements for receiving the longitudinal wires, means for driving said primary roll, back-up rolls supporting the primary roll, a gripping roller mounted above the grooved traction elements, a lever connected by a stationary pivot at its rear end with a support on the apparatus and having the gripping roller pivoted medially thereof, a piston and cylinder device connected with the free end of the lever and connected with a source of fluid pressure supply to move the lever and carry the roller downwardly to firmly grip a longitudinal wire.

17. An electrode assembly and power supply means for a wire mesh welding machine comprising a heavy beam disposed transversely of the machine, a series of welding electrodes removably and insulatingly secured to and depending from said beam, each electrode having an upper and lower terminal connection point disposed in offset planes, a series of electrical transformers supported on said beam, each transformer comprised of a plurality of secondary windings, each secondary winding having two terminals disposed in offset planes corresponding to the planes of said electrode connection points, respectively, and adapted to supply power to a circuit including two electrodes, a first heavy current conducting member adapted for attachment at one end to an terminal of a given secondary and at the other end to the upper terminal connection point of a selected electrode, a second heavy current conducting member adapted for connection at its upper end to another terminal of said secondary and at its lower end to the lower terminal connection point of a second electrode, whereby each of said conducting members is attached to a secondary terminal and electrode connection point lying in the same plane.

18. In an apparatus for welding longitudinal and transverse wires at the point of crossing, a rotatable conductive drum, a plurality of individual electrode carrying frames disposed radially of the axis of the drum, and each having a forwardly offset lower terminal face and an inwardly offset terminal face, a transformer having a plurality of secondary windings each provided with a pair of terminals, a conductor lead from one terminal of one of said secondary windings to the forwardly offset terminal face of one frame, and a conductor lead from the other terminal of said secondary winding to the inwardly offset terminal face of another of said frames.

19. In an apparatus for making reinforcing mesh of crossed longitudinal and transverse wires, a series of transformers, a rotary welding drum and a series of individual electrode assemblies each including a frame having rigid top and front arms and a lever pivoted at one end to the front arm, an electrode pivoted to the lever, a cushioning spring confined between the top arm and the lever for yieldingly urging the electrode toward the drum, and a fluid piston and cylinder connected to the top arm and the lever for pressing the crossed wires to be welded against the drum.

20. In an apparatus for making reinforcing mesh of crossed longitudinal and transverse wires, a series of transformers, a rotary welding drum and a series of individual electrode assemblies each including a frame having rigid top and front arms and a lever pivoted at one end to the front arm, said front arm having outwardly and inwardly disposed transformer lead anchoring faces for selectively receiving a conductive lead from a related transformer, an electrode pivoted to the lever, a cushioning spring confined between the top arm and the lever for yieldingly urging the electrode toward the drum, and a fluid piston and cylinder connected to the top arm and the lever for pressing the crossed wires to be welded against the drum.

21. An apparatus for continuously welding longitudinal and transverse wires into reinforcing mesh, comprising, a single lower rotatable drum and a series of upper rocker electrodes having spring return means and moved forward by the said wires passing between them and the drum and retracted by said spring means, a longitudinal wire storage area including a plurality of storage wire reels, tight wire indicator means through which the longitudinal wires pass from said wire storage area and including means for automatically stopping said power means when a snag or tangle occurs in any of said wires and causes the wire to be tensioned beyond a pre-determined point, longitudinal wire break indicating means at the threshold of the drum and electrodes and including means for automatically stopping said power means when a longitudinal wire breaks, conveyor and transfer means for transporting cross wires to a point of assembly with the longitudinal wires between the drum and the electrodes, and a tractor conveyor downstream of the drum and electrodes for pulling the completed mesh and the continuing longitudinal wires through the apparatus.

References Cited in the file of this patent

UNITED STATES PATENTS

| | | |
|---|---|---|
| 1,694,081 | Reed | Dec. 4, 1928 |
| 1,842,120 | Riley | Jan. 19, 1932 |
| 1,866,382 | White | July 5, 1932 |
| 1,895,577 | Little | Jan. 31, 1933 |
| 1,901,477 | Southwick | Mar. 14, 1933 |
| 2,295,925 | Biederman | Sept. 15, 1942 |
| 2,332,022 | Southwick | Oct. 19, 1943 |
| 2,390,174 | Roemer | Dec. 4, 1945 |
| 2,441,500 | Miess | May 11, 1948 |
| 2,487,392 | Southwick | Nov. 8, 1949 |
| 2,814,713 | Glantzer | Nov. 26, 1957 |